United States Patent [19]
Chadwick

[11] 4,112,774
[45] Sep. 12, 1978

[54] AIRCRAFT ROTOR OUT-OF-TRACK CORRECTION METHOD AND APPARATUS

[75] Inventor: James R. Chadwick, Bradbury, Calif.

[73] Assignee: Chadwick-Helmuth Company, Inc., Monrovia, Calif.

[21] Appl. No.: 757,622

[22] Filed: Jan. 7, 1977

[51] Int. Cl.² .................... G01M 1/22; G01M 1/28; G01M 9/00
[52] U.S. Cl. ........................................ 73/455; 73/147
[58] Field of Search ..................... 73/455, 147, 66; 356/28, 167

[56] References Cited

U.S. PATENT DOCUMENTS

| | | | |
|---|---|---|---|
| 2,338,293 | 1/1944 | Martin | 73/455 |
| 2,394,766 | 2/1946 | Halford | 73/147 |
| 2,951,542 | 9/1960 | Stulen et al. | 73/455 X |
| 3,802,273 | 4/1974 | Helmuth | 73/455 |

*Primary Examiner*—James J. Gill
*Attorney, Agent, or Firm*—William W. Haefliger

[57] ABSTRACT

Vibration of a bladed rotor is reduced by a method that includes:

(a) rotating the rotor at a selected power level, at which vibration is produced,

(b) detecting an out-of-track condition of a blade being rotated at that power level.

25 Claims, 14 Drawing Figures

AIRCRAFT ROTOR OUT-OF-TRACK CORRECTION METHOD AND APPARATUS

BACKGROUND OF THE INVENTION

This invention relates generally to balancing of rotors, and more particularly concerns method and apparatus for quickly and efficiently reducing a rotor blade out-of-track condition, and for determining the amount of weight to be added to or subtracted from predetermined positions on the rotor, after out-of-track is remedied.

It is a well known fact that a slight out of balance condition of an aircraft rotor, such as a propeller can cause roughness and vibration leading to premature wear and failure of the machine, and fatigue and annoyance of pilot and passengers. In the past, techniques used to correct out-of-balance in the field were crude, time consuming and inaccurate. For example, the mechanic would randomly add a weight to one of the several possible points of weight addition. The pilot and mechanic would fly the ship and try to judge whether the ship felt rougher or smoother; or the same. If rougher, the weight addition would be shifted to an opposite point; if then smoother, more weight would be tried (although it might really required less). If the same, another point would be tried. Generally, this would not lead to a smooth rotor, so weights would be added at another angular position, and the whole operation repeated. By repeating this procedure many times, vibration might be lessened, but the achievement of desired reduction was extremely unusual, because while the pilot could sense vibrational amplitude arising from rotor imbalance, he could not readily sense phase characteristics, and thus had no way of determining the locations for adding weights.

SUMMARY OF THE INVENTION

It is a major object of the invention to provide method and apparatus facilitating reduction or elimination of rotor blade out-of-track, and vibration associated therewith, so as to enable dynamic balancing of the rotor, the invention being particularly applicable to aircraft propellers.

Basically, the method involves the following steps:

(a) rotating the rotor at a selected power level, at which vibration is produced, (b) detecting an out-of-track condition of a blade being rotated at that power level, (c) repeating the (a) and (b) steps, but at another selected power level at which vibration is also produced, (d) such detection being carried out to detect at each power level the magnitude of out-of-track of a selected blade and its characteristic angularity about the blade axis at which such magnitude of out-of-track occurs, and As will be seen targets may be preliminarily attached to the blade tips and at different relative radial locations to enable visual discrimination as between the blades; detection of out-of-track may be carried out by edgewise observing the disc described by the blade tips during rotation; and individual blade pitch angle adjustment may be effected by bodily rotating the entire blade relative to a spinner to which the blade is attached. Further, the detection step typically includes operating a stroboscope (e) adjusting the pitch angle of the blade in a direction to reduce the out-of-track condition. directed at the blade tip disc described by the targets to isolate any target (and associated blade) subject to out-of-track displacement at a selected level of blade loading; and different power levels may be achieved by simultaneously controllably rotating all blades. Finally, the weighting of the rotor may be selectively adjusted to reduce or eliminate dynamic imbalance.

These and other objects and advantages of the invention, as well as the details of illustrative embodiments, will be more fully understood from the following description and drawings, in which:

DETAILED DESCRIPTION

In the drawings, rotors may take the form of the propellers 10 in FIGS. 1 through 8 carried by fixed wing aircraft 11, and defining axes of rotation 12. The rotor 10 may typically have multiple like blades such as are indicated at 10a, 10b and 10c extending outwardly from axis 12 at 120 degree intervals. Power is transmitted to the rotor as for example by shaft 15, gearing in gear box 16, and stub shaft 17 to which the blades are attached as via hub mechanism 18 by means of which the pitch of the blades may be conventionally changed. Suitable blade root fastener sleeve locations are indicated at 19, 20 and 21, these being equally angularly spaced about axis 12 and equally radially spaced outwardly from axis 12. It should be noted that the exact mechanical detail of blade attachment, pitch change means, etc., varies greatly from aircraft type-to-type, as do the number of blades. These mechanical considerations dictate the possible locations for weight addition.

Figures 3, 9, 10, 11:
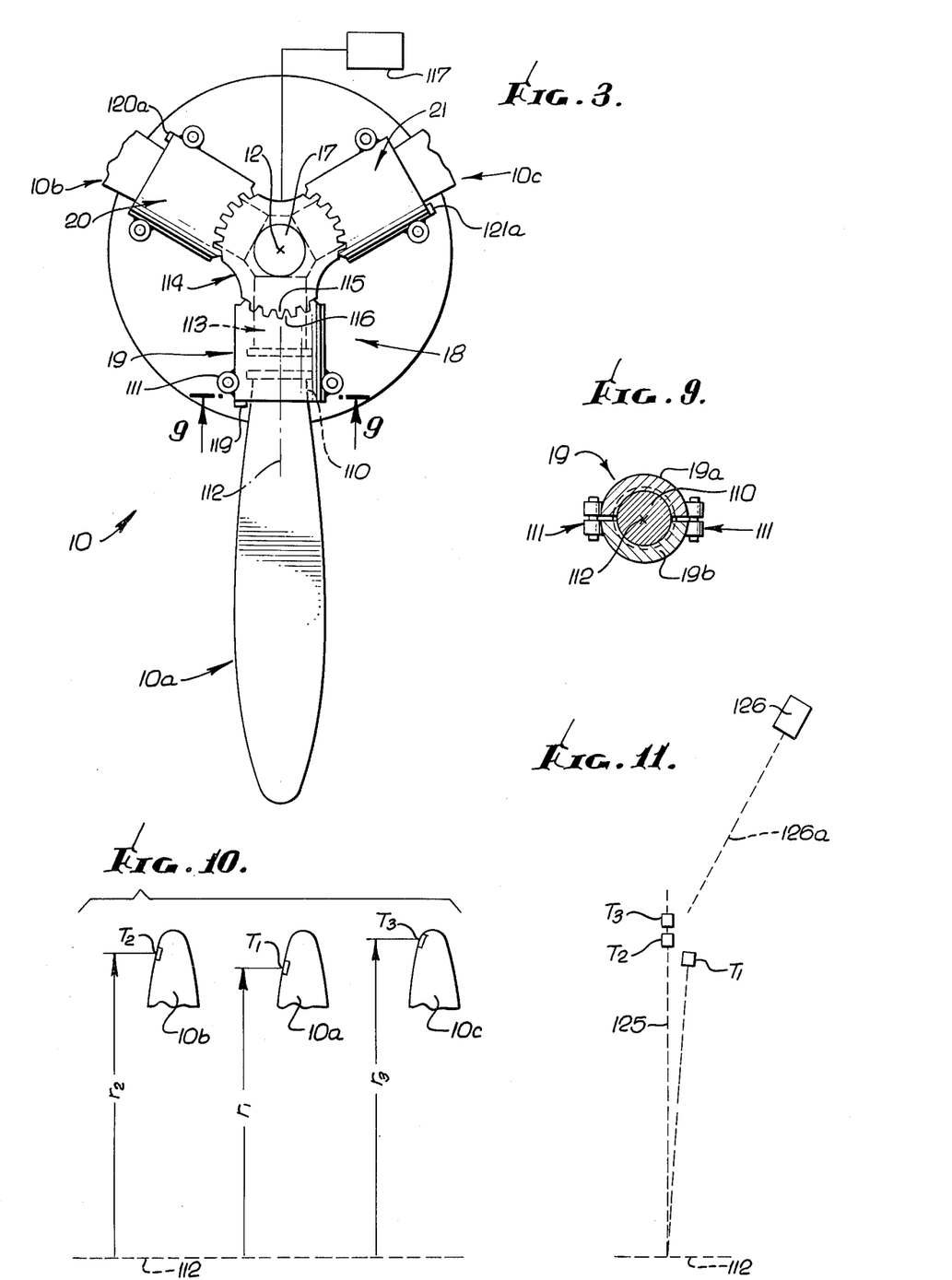
FIG. 3 is an enlarged and fragmentary front view showing propeller blade attachment to a drive shaft.
FIG. 9 is a section on lines 9—9 of FIG. 3.
FIG. 10 is a representation of target location or attachment to propeller blade tips.
FIG. 11 is a schematic edge view showing of rotating propeller blades, one of which has deflected relative to other, and in rotor axis direction, as indicated by "stroboscopically stopped" targets.

In the example, and as shown in FIG. 3 (which is representative only), a typical blade root 110 is frictionally retained between split sleeve sections 19a and 19b, the latter being retained in gripping condition as by threaded fastening means 111. Upon loosening of the latter, the blade 10a may be adjustably rotated about its radial axis 112, changing the pitch of blade 10a relative to the pitch of remaining blades 10b and 10c. The sleeves 19–21 are in turn carried for rotation on and about spinner stub axles 113 projecting from and integral with shaft 17. The pitch of all blades may be simultaneously adjusted as by rotation of a gear 114 about axis 12, the gear having teeth 115 meshing with teeth 116 on the sleeves 19–21. Suitable means may be provided, as schematically shown at 117, to rotate gear 114, thereby to simultaneously change the angle of attack of the blades, to achieve different power settings, as for example at the same RPM, and for purposes as will be later discussed.

The invention contemplates reducing vibration produced by an out-of-track condition of the blades, so that dynamic unbalance may thereafter be detected and remedied. In this regard, out-of-track vibration is typically caused by vibratory forces in the direction 120 parallel to the propeller axis 12; and vibration due to dynamic unbalance is caused by vibratory forces normal to axis 12. Accelerometers may be appropriately placed to detect, and discriminate between these vibrations.

The vibratory motion caused by these forces is similar — i.e. a rotation of the system about some axis (as for example a wing axis) plus wing vertical motion (there is not much motion fore and aft). Therefore, accelerometers to detect such motion are typically placed (in the case of a propeller having a forwardly directed horizontal shaft) to detect vertical motion perpendicular to the shaft and horizontal motion parallel to the shaft. Therefore, if vibration due to out-of-track is corrected or eliminated first, then vibration due to imbalance only can be successfully carried out.

In accordance with the method of the invention, the rotor or propeller is rotated at a first (zero or near zero) power level. An out-of-track condition of a blade (as may be produced by slight misalignment of the blades-not due to aerodynamic forces) is detected while the rotor is rotated at the first power level; the rotor is then run at a second (non-zero) power level and out-of-track vibration detected. The rotor is then stopped and the pitch angle of the blade or blades is adjusted in a direction to reduce the change in out-of-track condition at that power level i.e. to reduce movement of a blade tip away from the disc established by blade tip rotation at zero power level. These steps are typically repeated until vibration produced by out-of-track is reduced further or substantially eliminated. For example, it is desired that the vibration level be brought back to that at zero-power level. Theoretically, the three power levels tested are zero, one-half power, and full power; however, in practice, as the power level is changed, by changing the pitch angle of all blades together, such angles will probably not all change exactly the same; thus, out-of-track vibration does not change linearly with power change; therefor, optimization at cruise power rather than full power is desirable. It should be pointed out that vibration caused by out-of-track will change with power change, while vibration caused by unbalance does not change with power change. Therefore, one seeks to adjust track of the blades to achieve no change in vibration with power, or no change in visually perceived or detected track in response to power changes.

Typically, targets are first attached to the blade tips, and at different relative radial locations, to enable visual discrimination as between the blades; for example, as seen in FIGS. 10 and 11 the targets (such as retro-reflective self-adhesive tape) $T_1 - T_3$ are attached to the tip portions of the blades 10a–10c, shown at their vertical position, for comparison. The targets are typically located at the leading edges of the blades, and at different radii $r_1 - r_3$, as shown, according to the relationships:

$$r_1 \approx r_2 \approx r_3 \qquad (b\ 1)$$

$$r_1 < r_2 < r_3 \qquad (2)$$

Accordingly, when the rotor or propeller is rotated, if blade 10a is flexed to an out-of-track condition at a first power level, the target $T_1$ on that blade will for example, appear to move out of the disc 125 described by the targets $T_2$ and $T_3$, when the blades are observed edgewise as in FIG. 11. For this purpose, a stroboscope may be directed edgewise at the targets on the propeller, and synchronized to "stop" each target in blade vertical position. Such a stroboscope is schematically indicated at 126 in FIG. 11, with beam 126a directed at the target area; also, the stroboscope may be operated in aircraft flight, i.e. directed through a window at the blade targets in blade upright position. Note that all targets are simultaneously displayed in FIG. 11 and at different relative radial locations, to enable visual discrimination as between the blades.

It is clear from FIG. 9 that an out-of-track blade may be rotated in its mounting sleeve, or "grip" such as 19, after loosening of the fasteners 111, to increase or decrease the blade angle of attack, so as to reduce the out-of-track condition, resulting in movement of the target (such as $T_1$) back into or toward the disc 125 in FIG. 11, under blade load conditions.

As described above, the out-of-track condition or conditions are desirably detected for different power levels, and correction is made for each, it sometimes being necessary to correct different blades at different power levels. Such levels may be achieved at different propeller RPM's for the same blade angle-of-attack settings; or, for the same RPM and with different blade angle-of-attack settings. For the latter purpose, gear 114 may be rotated to simultaneously adjust all the blade sleeves 19–21, as described above. The term "power level" is meant to describe a condition of blade loading, i.e. productive of fluid media displacement by the blades.

Following correction for out-of-track, the propeller may be accurately dynamically balanced. For this purpose, a vibration pickup such as an accelerometer is attached to the aircraft structure proximate the rotor; and, in the example described an accelerometer 24 is shown attached to gear box 16. This instrument is operated to produce an output acceleration signal which is a function of oscillatory motion of the structure, as for example the wing structure 13, and which arises due to dynamic unbalance of the rotating rotor. Thus, the wing structure may undesirably vibrate in one or more directions, it being a further purpose of the invention to significantly reduce or eliminate such vibration. Depending on structure, the vibration (motion) may be linear, elliptical, or even circular. While the accelerometer is shown as attached to the gear box, it will be understood that it may be attached to other structure, so long as such structure is subject to rotor unbalance induced oscillatory motion which is to be reduced or eliminated. While an accelerometer has been referred to, any transducer producing a cyclic output signal in response to structure vibrations may be used.

The vibration pickup output is typically an electrical signal varying in accordance with the vibration, and therefore constitutes an output signal. That signal is typically processed to produce a corresponding output signal to be used to operate a meter or other device to indicate amplitude, and to display phase. For that purpose processing circuitry may be electrically connected between the accelerometer or pickup 24 and the phase display and may advantageously include a band pass filter 29 and a trigger 35 seen in FIG. 5, these individually being well known components. The filter 29 has the dual functions of passing the accelerometer signal corresponding to the structure oscillation frequency to be reduced or eliminated (usually the fundamental), while rejecting other signals corresponding to other excitation frequencies, and also integrating the selected or passed signal to thereby produce an output velocity signal on lead 32. Filter 29 may be manually tuned, as by rotating knob 33, to select the frequency of the structure vibration to be reduced or eliminated; further, the filter may be "stagger tuned" to provide a rather broad range of pass frequencies as indicated between the limits $f_1$ and $f_2$ of response curve 36 in FIG. 6 rather than a narrow range of pass frequencies as indicated by the response curve 37 in that figure. A meter 39 in FIG. 5 indicates accelerometer velocity, as for example in inches per second, which may represent the maximum velocity of the wing structure as it vibrates. In this regard, and as will be seen, an important advantage in converting the maximum accelerometer output to a maximum velocity signal (rather than acceleration or displacement) lies in the fact that whereas displacement and acceleration outputs for acceptable vibration levels vary widely (as a function of rate or frequency) velocity outputs for acceptable vibrations vary much less widely, and use of the latter for balancing purposes enables use of the same instrumentation, without "range changing," for all such applications.

The stagger tuned vs single tuned filter characteristic is used to verify tuning, for when the "verify tune" button is depressed, the filter converts from its stagger-tuned characteristic to single tuned. If the rate is not set in exact coincidence with the rotor rate, the amplitude and/or observed phase will change. Tuning is adjusted as required (front panel control) until there is no change when the button is pushed.

Figure 5:
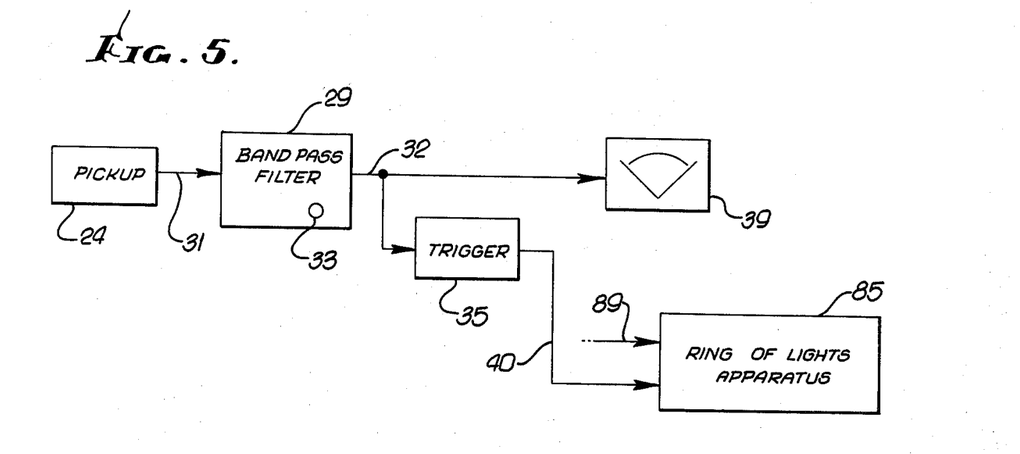
FIG. 5 is a block diagram of circuitry used in the balancing process.
Figure 7:
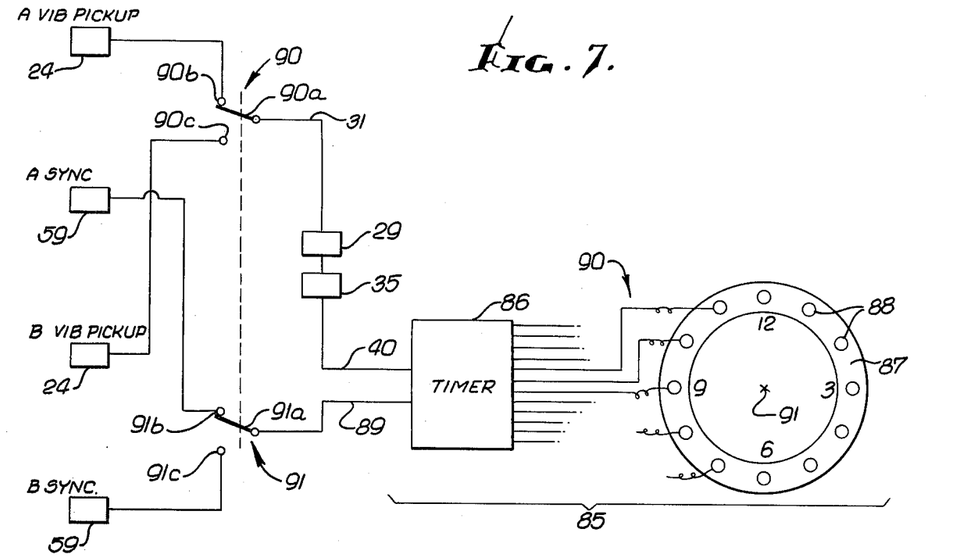
FIG. 7 is a switch and light arrangement.

Trigger circuit 35 operates in response to occurrence of positive going zero crossing of the velocity signal on lead 32, for cyclically triggering the phase indicator 85 to which the trigger circuit is connected as via lead 40. An example of a known usable phase indicator in PHAZOR Model 171, a product of Chadwick-Helmuth Co., Monrovia, California. That device, may include a timer 86 and a ring 87 with lights or indicators 88 at equispaced angular intervals on the ring, as seen in FIG. 7. The lights may be in any suitable array. The timer receives a sync signal once each revolution of the rotor, for example on line 89 to which the sync signal generator 59 may be connected. The sync signal may be derived from a magnetic pick-up 59 secured to a fixed structure 60 (better seen in FIG. 4), the pick-up projecting near a hub 61 rotated by stub shaft 17. The hub carries a component such as soft iron element 59a, which magnetically actuates the pick-up to produce the sync signal, once for each revolution of the rotor. The timer is connected via leads 90 with all twelve (or other number) of lights 88 to turn them on in succession and in synchronism with the rotating "clock position" of the rotor; however, the timer also receives the trigger signal output on lead 40 as shown in FIG. 5. The timer only passes or gates an energizing signal to that light which is closest in synchronized position about axis 91 to a "target" blade position about axis 12 at the moment of trigger signal transmission. Accordingly, the operator may observe the angular clock position of the energized light or indicator, on the ring 87 in the pilot's compartment, and use the information as described above in the determination of rotor weighting.

The rotor characteristic angularity as revealed by the phase indicator is determined by the complex spring (of the supporting airframe) mass (of the rotor) system and the rotor rate. Each rotor of each aircraft type has a characteristic phase (or angularity) relation. Knowing such angularity, which may be expressed as "clock" position and the magnitude of the maximum output velocity signal as it appears on meter 39, one may vary the weighting of the rotor to achieve substantial balance. In this regard, a small weight or weights may be added to or subtracted from the rotor at any of the fastener locations 119–121, the amount of such weighting change and the particular fastener locations at which the change is to be effected being determined by the reading on meter 39 and the clock position as indicated by the phase meter. Accordingly, costly and time consuming trial and error weight change procedures are eliminated. Such weights may consist of washers to be added to or removed from threaded fasteners.

In accordance with a further important aspect of the invention, the determination of location and amount of rotor weighting may advantageously include the step of establishing a multi-coordinate system characterized in that:

(a) a first coordinate scale delineates values of the velocity signal, (b) a second coordinate scale delineates values of blade angularity (clock position) about its axis of rotation; and (c) other coordinate scale means delineates weight values to be added or subtracted at at least one position on the rotor, and further characterized in that any point in the system or field defined by associated blade angle and velocity value coordinates in turn defines particular weighting to be added or subtracted at a position or positions on the rotor.

The referenced multi-coordinate system may be established in analog form (as for example graphic), tabular form, or in digital form (as for example in a digital computer memory).

Basically, for any point in the coordinate system defined by particular blade angle and velocity value coordinates, there is associated or defined particular weighting to be added or subtracted at the referenced position or positions on the rotor.

Figures 1, 2, 4, 6:
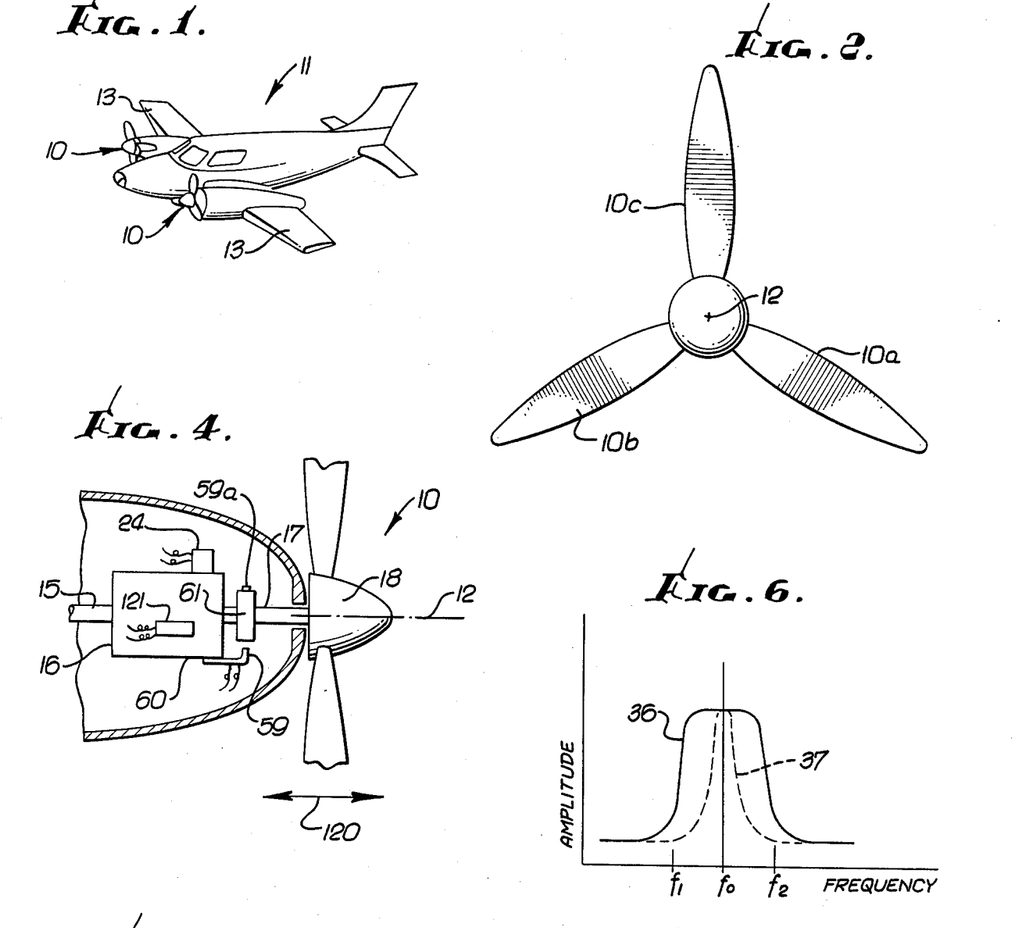
FIG. 1 is a perspective view of a fixed-wing aircraft having two rotors or propellers to be balanced.
FIG. 2 is a front view of a propeller as used on the FIG. 1 craft.
FIG. 4 is a side elevation showing mounting of a transducer and sync generator in relation to the propeller.
FIG. 6 is a frequency response diagram.
Figure 8:
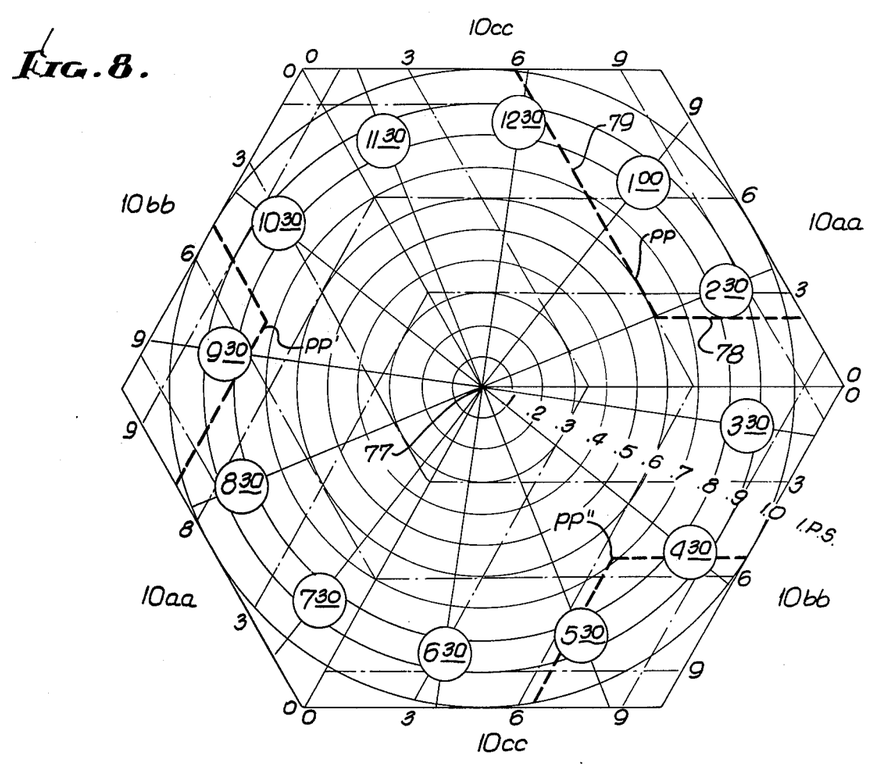
FIG. 8 is a coordinate system graph.

Assuming a main rotor 10 having three propeller blades indicated at 10a, 10b and 10c in FIGS. 2 and 3, the latter may have fixed weight addition or subtraction positions 119, 120a and 121a indicated in FIG. 3 on sleeves 19, 20 and 21. The determination of the amount of weight to be changed at any two of the three positions to overcome dynamic unbalance may be made with the aid of a multi-coordinate system as for example is shown in FIG. 8. As there seen, a first coordinate scale may be defined by concentric circles about center or pole 77, and identified by the i.p.s (inches per second velocity output) number 0.1 to 1.0; and a second coordinate scale (delineating values of the angularity) is defined by the radial lines spaced apart at 30° intervals and identified by "clock positions" 12:30, 1:30–11:30. Other coordinate scale means delineating weight values to be added at at least two positions on the rotors are indicated at 10a, 10b and 10c locations along hexagonal lines as shown.

In an example, assume a point PP representing a phase indicator determined rotor angle or "clock position" at 2:30, and also representing a velocity signal (derived from the accelerometer, as described) of about 0.6 inches per second. The two auxiliary scales applicable to this position are the 10aa scale and 10cc scale at the top and top right of FIG. 8. As indicated, the corresponding intercept along line 78 on that 10aa scale is approximately 2 weight values grams, for example) to be added to the 10a blade at position 20, and the corresponding intercept along line 79 on that 10cc scale is approximately 5.8 weight values to be added to the 10c blade at position 19, in FIG. 3. The intercept lines are parallel to the hexagonal scale lines 10aa, 10bb and 10cc in FIG. 8. Note that a point PP' would have intercepts on the 10aa and 10bb scales as shown, and that a point PP" would have intercepts on the opposite 10cc and 10bb scales, as shown. Also note that weights are to be added in every case, rather than subtracted.

In this regard, it should be noted that each rotor has certain locations, which will always be the same for that rotor type, at which weights may be added. The charts "reflect" the geometry of those possible points where weight may be added in relation to the rotor. Thus each rotor of each type of ship must have its own chart.

Using the above method, the aircraft propeller may be rapidly and accurately balanced with minimum cost and delay.

The compelling reason for the device 85 is that balance must be accomplished in the air for most ships.

FIG. 7 shows an arrangement facilitating balancing of two propellers or rotors on a single aircraft. Each of the separate A and B rotors (see for example propellers 10 in FIG. 1) defines its own axis of rotation; separate A and B structures such as gear boxes 16 are located proximate the respective rotors, and each structure is subject to vibratory motion due to imbalance of its associated rotor. Thus, each wing 13 in FIG. 1 may vibrate due to imbalance of the propeller carried by the wing. In this environment, the apparatus comprises:

(a) A and B vibration pickups 24 attachable to the respective A and B structures 16 so that each pickup produces an output signal which varies as a function of such vibratory motion, and circuitry for processing each said signal to produce a cyclic signal, (b) A and B sync signal generators 59 for generating timing signals once each cycle of rotation of the rotors, (c) means responsive to a selected rotor cyclic signal and timing signal for determining the characteristic angularity of the selected rotor about its said axis once each cycle of the cyclic signal, whereby the weighting of the rotor may be varied as a function of a magnitude of said cyclic signal and of said characteristic angularity, to achieve substantial dynamic balance of the rotor, and (d) switch means operatively connected between the A and B vibration pickup and sync signal generator and said means to selectively connect either the A pickup and A generator with said means or the B pickup and B generator with said means. See for example the double pole, single throw switches 90 and 91 having ganged arms 90a and 91a respectively connected to leads 31 and 89. Pickups 24 are connected to poles 90b and 90c, and sync generators are connected to poles 91b and 91c. In one position of the arms, the A pickup 24 and generator 59 of one rotor are connected to timer 86; and in the other arm positions, the B pickup and generator are connected with the timer. Thus, one may readily determine the balance requirements of each propeller, as selected, and in flight.

In accordance with a further aspect of the invention, vibration pick-up means (such as accelerometer 121) is provided and oriented to detect vibratory motion of structure associated with the rotor and generally parallel to the rotor axis (as for example once-per-revolution vibration parallel to axis 12), and to produce corresponding vibratory signals. Typically, any out-of-track of the blades will produce a once-per-revolution vibration of the structure, such as gear-box 16 for example.

As described above, the pick-up output signal or signals may be employed to enable adjustment of the angle-of-attack or pitch of at least one of the blades, in an effort to reduce the amplitude of the vibratory signals; and such adjustment is repeated as necessary to further reduce the pick-up output signal amplitude, such repetition typically being carried out to determine a minimum or near minimum values for the once-per-revolution signal amplitude for a particular set of blades.

Typically, the aircraft is set down, after the in-flight measurement of the vibratory output of pick-up 121, and the pitch adjustment effected by adjustably rotating a blade such as 10a relative to its grip sleeve 19.

Ultimately, if the minimum attainable value of vibratory output of the pick-up 121 is not acceptably small, it is recognized that a new blade should be substituted for the still excessively out-of-track blade, and this determination can quickly be made, at field locations, using the further principles of the invention.

Figure 12:
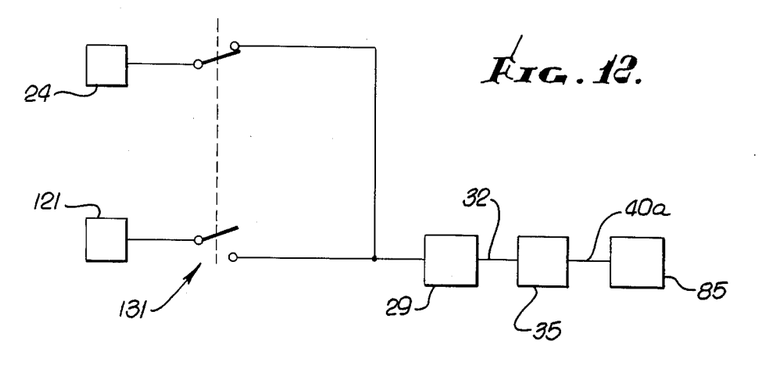
FIG. 12 is a circuit diagram.

In this regard, and referring to FIG. 12, the auxiliary device 85, as previously described, can be employed on the aircraft, during flight, to determined blade clock angle associated with the trigger signal on lead 40a, the trigger signal produced in response to the occurrence of positive going zero crossing of the velocity signal on lead 32, in response to output from pick-up 121.

Figure 13:
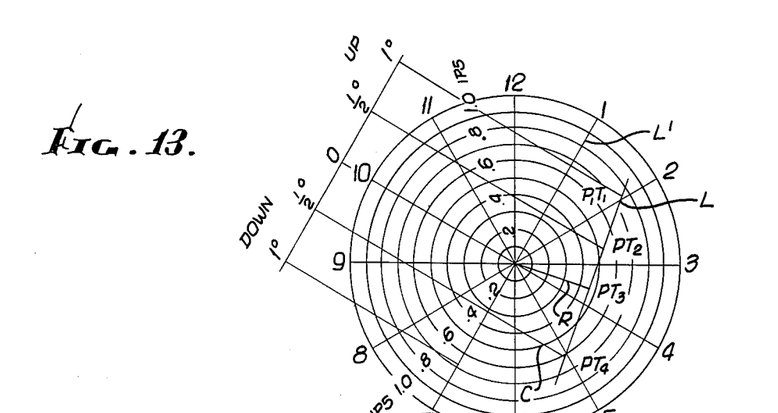
FIGS. 13 and 14 are polar coordinate graphs.

Referring to FIG. 13, points $PT_1$, $PT_2$, $PT_3$ and $PT_4$ are shown in a polar coordinate field or graph characterized by clock angle and radial (signal velocity amplitude) dimensions in ips (inches per second), the graph being similar to FIG. 8. The graph is calibrated as shown in degrees and fractions of degrees corresponding to the amount of pitch adjustment required to minimize the pick-up output amplitude, for a two-bladed rotor.

Figure 14:
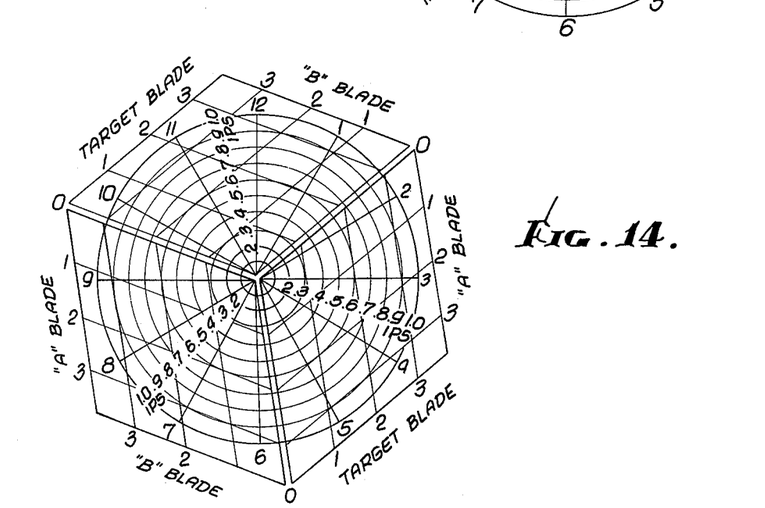

The four points $PT_1$–$PT_4$ having different ips values at different clock angles, are typical of the vibratory signal values and characteristic clock angles derived by the method described above (with repetitive adjustments in effective blade pitch angle), and they are found to define a line such as line L. The latter is shown as generally parallel to the 1-o'clock–7-o'clock line L' through the center of the graph, the center representing zero vibratory signal amplitude. The minimum spacing of the line L from the center is represented by radius R of a "lowest out-of-track vibration" circle C, the latter representing the minimum vibratory (out-of-track) signal amplitude characteristic of the particular rotor under test. In other words, optimization of the pitch adjustment of the blade or blades will produce a level of vibration no better than that associated with the radius R of circle C; therefore, one can quickly determine, using the line of points method, whether or not a given set of rotor or propeller blades can be adjusted in effective pitch or angle-of-attack to produce an acceptable minimized out-of-track vibration, and if R is too great, a change in blade or blades or other rotor component is indicated or required. After this adjustment, the rotor is dynamically balanced, as described above. FIG. 14 shows a tracking chart for a three-bladed rotor or propeller, for use in line of points determination.

I claim:

1. In the method of reducing vibration produced by rotation of a bladed rotor having multiple blades with adjustable pitch angles, and wherein structure associated with the rotor is subject to vibratory motion due to an out-of-track condition of the blades, the steps that include:
   (a) rotating the rotor at a selected power level, at which vibration is produced,
   (b) detecting an out-of-track condition of a blade being rotated at that power level,
   (c) repeating said (a) and (b) steps, but at another selected power level at which said vibration is also produced,
   (d) said detection being carried out to detect at each power level the magnitude of out-of-track of a selected blade and its characteristic angularity about the blade axis at which said magnitude of out-of-track occurs, and
   (e) adjusting the pitch angle of the blade in a direction to reduce said out-of-track condition.

2. The method of claim 1 wherein said pitch angle adjustment is effected by bodily rotating the entire blade relative to a spinner to which the blade is attached.

3. The method of claim 1 wherein said detection is carried out by edgewise observing the disc described by the tips of the blades during rotation thereof.

4. The method of claim 1 including the further step of selectively adjusting the weighting of the rotor to reduce vibration caused by rotor dynamic imbalance.

5. The method of claim 1 wherein said blades are carried by a spinner and are simultaneously adjustable about axes of rotation extending outwardly of the spinner to provide adjustable angles of attack, and said first and second power levels are at least in part produced by rotating the blades at first and second angles of attack, respectively.

6. The method of claim 1 wherein vibratory signals produced by said vibration are measured at associated blade clock angle positions about the rotor axis, and said repetition of said (a), (b) and (c) steps is carried out to derive a line of points in a polar coordinate field characterized by clock angle and signal amplitude dimensions, each point representing a measured value of vibratory signal amplitude at a selected blade clock angle.

7. The method of claim 6 including the steps of determining the minimum spacing of said line of points to the center of said polar coordinate system, thereby to determine the minimum vibratory signal amplitude characteristic of said rotor.

8. The method of claim 1 wherein said adjustment of blade pitch angle is carried out to reduce said magnitude at said power level.

9. The method of claim 1 including the preliminary step of rotating the rotor at substantially zero power level, and observing the disc defined by tip portions of the rotating blades, the out-of-track condition of blades at said selected power levels being characterized by blade tip movement away from said disc.

10. The method of claim 9 wherein said selected power levels include cruise power level.

11. The method of claim 1 including the preliminary step of mounting an accelerometer on said structure to detect acceleration generally parallel to an axis of rotation defined by the rotor, said detection step including processing the output of said accelerometer.

12. In the method of reducing vibration produced by rotation of a bladed rotor having multiple blades with adjustable pitch angles, and wherein structure associated with the rotor is subject to vibratory motion due to an out-of-track condition of the blades, the steps that include:
   (a) rotating the rotor at a selected power level, at which vibration is produced,
   (b) detecting an out-of-track condition of a blade being rotated at that power level,
   (c) repeating said (a) and (b) steps but at another selected power level at which said vibration is also produced,
   (d) said detection being carried out by edgewise observing the disc described by the tips of the blades during rotation thereof, and
   (e) adjusting the pitch angle of the blade in a direction to reduce said out-of-track condition,
   (f) the method including the preliminary step of attaching targets to the blade tips, and at different relative radial locations to enable visual discrimination as between the blades.

13. The method of claim 12 wherein said detection step includes operating a stroboscope directed at the blade tip disc described by said targets to isolate a target subject to out-of-track displacement at said power level.

14. In combination with a rotor defining an axis of rotation and structure proximate the rotor subject to vibratory motion due to an out-of-track condition of rotor blades,
   (a) targets at the leading edges of the end portions of said blades, the targets located at different radial dimensions from said axis, and
   (b) stroboscope means directed at the blade end portions and operating at a frequency characterized as displaying all the targets at approximately the same location while the rotor is rotating in a fluid medium acting to load the rotor.

15. The combination of claim 14 wherein the rotor comprises an airplane propeller.

16. In combination with a rotor defining an axis of rotation and structure proximate the rotor subject to vibratory motion due to an out-of-track condition of rotor blades, and to dynamic imbalance of the rotating rotor, apparatus comprising
   (a) targets at the leading edges of end portions of the rotor blades to be displayed in response to operation of stroboscopic means while the rotor is rotating in a fluid medium acting to load the rotor, the targets respectively located at different radial dimensions from the rotor axis, (b) a vibration pickup attachable to said structure to produce an output signal which varies as a function of said vibratory motion, and circuitry for processing said signal to produce a cyclic signal, and
   (c) means responsive to said cyclic signal for determining the characteristic angularity of said rotor about said axis once each cycle of said signal,
   (d) whereby the weighting of the rotor may be varied as a function of the magnitude of said cyclic signal and of said characteristic angularity, to achieve substantial dynamic balance of the rotor.

17. The combination of claim 16 wherein said means includes an array of indicators subject to successive energization in synchronism with rotor rotation, and timing means for gating the energization of only that indicator whose relative position in the array most closely corresponds to the characteristic angularity of said rotor.

18. The apparatus of claim 17 wherein said timing means includes a sync signal generator positioned to generate a sync signal once each cycle of rotor rotation.

19. The apparatus of claim 16 including said structure to which the pickup is attached.

20. The apparatus of claim 16 wherein said circuitry includes a band pass filter receiving the pickup output signal and producing a velocity output signal which constitutes said cyclic signal, the filter including means to rapidly convert between relatively wide and relative narrow frequency band tuned conditions and also to vary the center frequency of said narrow band filtering so that observed variations in said characteristic angularity may be eliminated.

21. The apparatus of claim 20 including a multi-coordinate system characterized in that a first coordinate scale delineates values of said output velocity signal, a second coordinate system delineates values of said rotor angularity about said axis, and other coordinate scale means delineates weight values to be added or subtracted at at least one predetermined position on the rotor, and further characterized in that any point in the system defined by particular rotor angle and velocity value coordinates in turn defines, by reference to said other scale means, particular weighting to be added or subtracted as defined.

22. The apparatus of claim 16 wherein said rotor includes an aircraft propeller having multiple blades.

23. The apparatus of claim 16 including adjustable means gripping each blade and characterized as allowing bodily rotation of each blade to change its angle of attack to reduce blade out-of-track.

24. The apparatus of claim 23 including means to simultaneously rotate all the blades to change their angle of attack for achieving different load conditions of the blades at which one or more of the blades may deflect into an out-of-track condition.

25. In the method of reducing vibration produced by rotation of a bladed rotor having multiple blades with adjustable pitch angles, and wherein structure associated with the rotor is subject to vibratory motion due to an out-of-track condition of the blades, the steps that include:
(a) rotating the rotor at a selected power level, at which vibration is produced,
(b) detecting an out-of-track condition of a blade being rotated at that power level,
(c) repeating said (a) and (b) steps but at another selected power level at which said vibration is also produced, and
(d) adjusting the pitch angle of the blade in a direction to reduce said out-of-track condition at said power level,
(e) the method including the preliminary step of mounting an accelerometer on said structure to detect acceleration generally parallel to an axis of rotation defined by the rotor, said detection step including processing the output of said accelerometer,
(f) the method including the added step of mounting an accelerometer on said structure to detect acceleration generally normal to said axis of rotation and produced by dynamic unbalance of said rotor, detecting said dynamic unbalance through use of said last named accelerometer during rotor rotation, and selectively adjusting the weighting of the rotor to reduce vibration caused by rotor dynamic unbalance.

* * * * *